United States Patent
Cheng

(10) Patent No.: US 7,467,405 B2
(45) Date of Patent: Dec. 16, 2008

(54) METHOD AND APPARATUS FOR DETECTING AN UNAUTHORIZED CLIENT IN A NETWORK OF COMPUTER SYSTEMS

(75) Inventor: Tung Sheng Cheng, Dadu Township (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 827 days.

(21) Appl. No.: 10/873,654

(22) Filed: Jun. 22, 2004

(65) Prior Publication Data

US 2006/0047823 A1 Mar. 2, 2006

(51) Int. Cl.
*G06F 7/04* (2006.01)
(52) U.S. Cl. .......................... 726/10; 726/24
(58) Field of Classification Search ............ 726/10, 726/24; 713/188
See application file for complete search history.

(56) References Cited

U.S. PATENT DOCUMENTS

| | | | |
|---|---|---|---|
| 5,559,960 A | 9/1996 | Lettvin | |
| 5,826,012 A | 10/1998 | Lettvin | |
| 6,304,969 B1 | 10/2001 | Wasserman et al. | |
| 6,502,192 B1 | 12/2002 | Nguyen | |
| 6,631,137 B1 | 10/2003 | Lorrain et al. | |
| 6,760,748 B1 * | 7/2004 | Hakim | 709/204 |
| 6,826,690 B1 * | 11/2004 | Hind et al. | 713/186 |
| 2001/0044893 A1 * | 11/2001 | Skemer | 713/153 |
| 2004/0076120 A1 * | 4/2004 | Ishidoshiro | 370/252 |
| 2005/0246767 A1 * | 11/2005 | Fazal et al. | 726/11 |

OTHER PUBLICATIONS

"BOOTP", www.webopedia.com/TERM/B/BOOTP.html, Nov. 4, 2003, 1 page.
"Bootstrap Protocol (bootp)", www.linus.about.com/cs/linus101/g/bootp.htm?terms=bootp, Nov. 4, 2003, 1 page.
"BOOTP, Bootstrap Protocol", www.networsorcery.com/enp/protocol/bootp.htm, Nov. 4, 2003, 4 pages.
"DHCP", http://compnetworking.about.com/library/glossary/bldef-dhcp.htm, Nov. 4, 2003, 1 page.
"DHCP FAQ", May 18, 2004, 24 pages.
"MAC address", www.webopedia.com/TERM/M/MAC_address.html, Nov. 4, 2003, 2 pages.
"The MAC Address, The Introduction to MAC Addressing", http://compnetworking.about.com/library/weekly/aa062202a.htm?terms=MAC+address, Nov. 4, 2003, 2 pages.
"The MAC Address, Finding MAC Addresses", http://compnetworking.about.com/library/weekly/aa062202b.htm, Nov. 4, 2003, 2 pages.
"The MAC Address, Changing MAC Address" ttp://compnetworking.about.com/library/weekly/aa062202c.htm, Nov. 4, 2003, 3 pages.

* cited by examiner

*Primary Examiner*—Andrew L Nalven
(74) *Attorney, Agent, or Firm*—Haynes Boone, LLP

(57) ABSTRACT

A method and system for detecting an unauthorized client system attempting to connect to a network of computer systems is disclosed. The network includes a certification authority server that includes a database of unique identification codes of authorized network client systems. A client system attempting to connect to the network transmits an authorization code over the network. If the client's authorization code matches an authorization code stored in the database of the certification authority server, then the client is authorized and is sent a network address which the client can use to communicate with other clients. However, if there is no match, the client is unauthorized and is scanned for viruses by an anti-virus server also on the network. Alternatively, the unauthorized client is blocked from the network without performing a virus scan.

15 Claims, 5 Drawing Sheets

FIG. 3A

| WAITING LIST ||
|---|---|
| SOURCE ADDRESS | TIME |
| MAC ADDRRESS 1 | 11:55:30 |
| MAC ADDRRESS 2 | 11:55:35 |

| TO DO LIST ||
|---|---|
| SOURCE ADDRESS | ACTION |
| MAC ADDRRESS 1 | PERMIT |
| MAC ADDRRESS 2 | WANTED |

310

METHOD AND APPARATUS FOR DETECTING AN UNAUTHORIZED CLIENT IN A NETWORK OF COMPUTER SYSTEMS

BACKGROUND

The present disclosure relates generally to the field of computer systems, and more particularly, to a system and method for detecting an unauthorized client in a networked computer system.

A convenient way for networked computer systems to communicate with one another is through the used of internet protocol or "IP" addresses. In such systems, each client computer on the network is assigned a unique IP address. In some systems, the IP address assigned to a particular computer system is a "static IP address", namely an IP address that remains fixed over time. In other systems, IP addresses which are not currently in use by computer systems on the network are reassigned to computer systems currently requesting assignment of an IP address. IP addresses which are reused or recycled are often referred to as "dynamic IP addresses" because they change over time from computer system to computer system.

Dynamic IP addresses are a very convenient way to manage addressing in the enterprise environment which includes large numbers of client systems all competing for a limited pool of IP addresses. However, the dynamic addressing approach involves some significant network security concerns. Assume for example the case of an unauthorized client which, unknown to the user, is infected with a virus. If the unauthorized client connects to the network and requests an IP address, it is possible that the unauthorized client will automatically obtain an IP address from a network server. It is then possible that the virus code on the unauthorized client will attack the server and/or other clients on the network.

Accordingly, what is needed is a system and method for assigning addresses for client systems in a manner which solves the problem described above.

BRIEF DESCRIPTION OF THE DRAWINGS

FIG. 3A is a representation of a waiting list employed by the certification authority server of the network.

FIG. 3B is a representation of a to do list employed by the certification authority server of the network.

DETAILED DESCRIPTION

Figure 1:
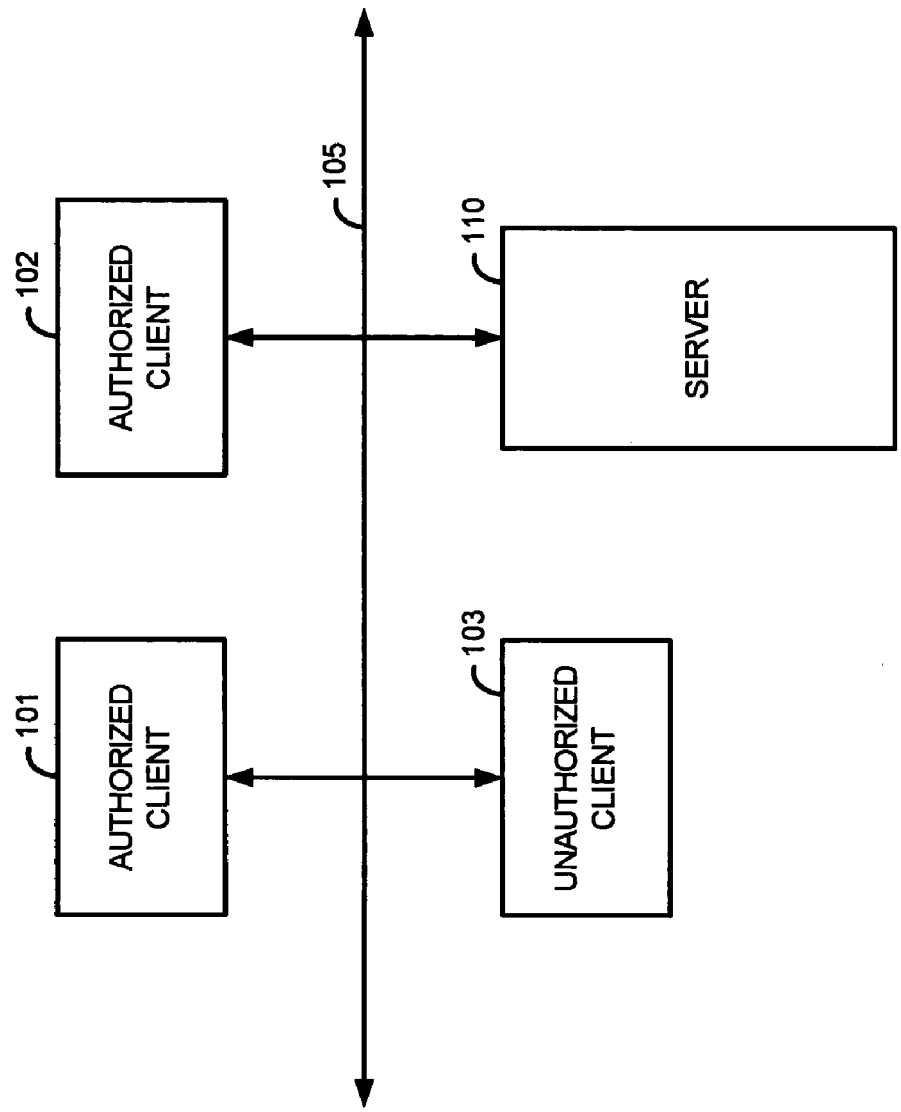
FIG. 1 is a block diagram of a conventional computer network including both authorized clients and unauthorized clients.

The present disclosure relates generally to a system and method for detecting an unauthorized client in a networked computer system. It is understood, however, that the following disclosure provides many different embodiments, or examples, for implementing different features of the disclosure. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, a conventional networked computer system is shown as system 100. System 100 includes multiple client systems, for example client systems 101, 102 and 103, which are connected by a computer network 105 to a network server 110. Network server 110 is configured to dynamically assign IP addresses to client systems requesting IP addresses. Of course many other client systems can be coupled to network 105 in addition to those shown. In this particular example, both clients 101 and 102 are authorized systems. In other words, client systems 101 and 102 are clients for which the operator of server 110 intends to allow operation on network 105. An unauthorized client such as unauthorized client 103 is a client for which the operator of server 110 does not intend to allow operation on network 105. When authorized client systems 101 and 102 join network 105 and contact server 110 to obtain an IP address, server 110 dynamically assigns each of clients 101 and 102 an available unique IP address. Unfortunately however, if unauthorized client 103 connects to network 105 and requests server 110 to dynamically assign an IP address, server 110 may dynamically assign an IP address to client 103. Unauthorized client 103 may then have access to server 110 and the other clients on network 105. If unauthorized client 103 contains virus code, the virus code may attack authorized client 101 and 102 and may also attack server 110. When the client receives an IP address directly from server 110, it is difficult to discriminate an authorized client from an unauthorized client based upon the client's dynamically assigned address because that address changes frequently.

Figure 2:
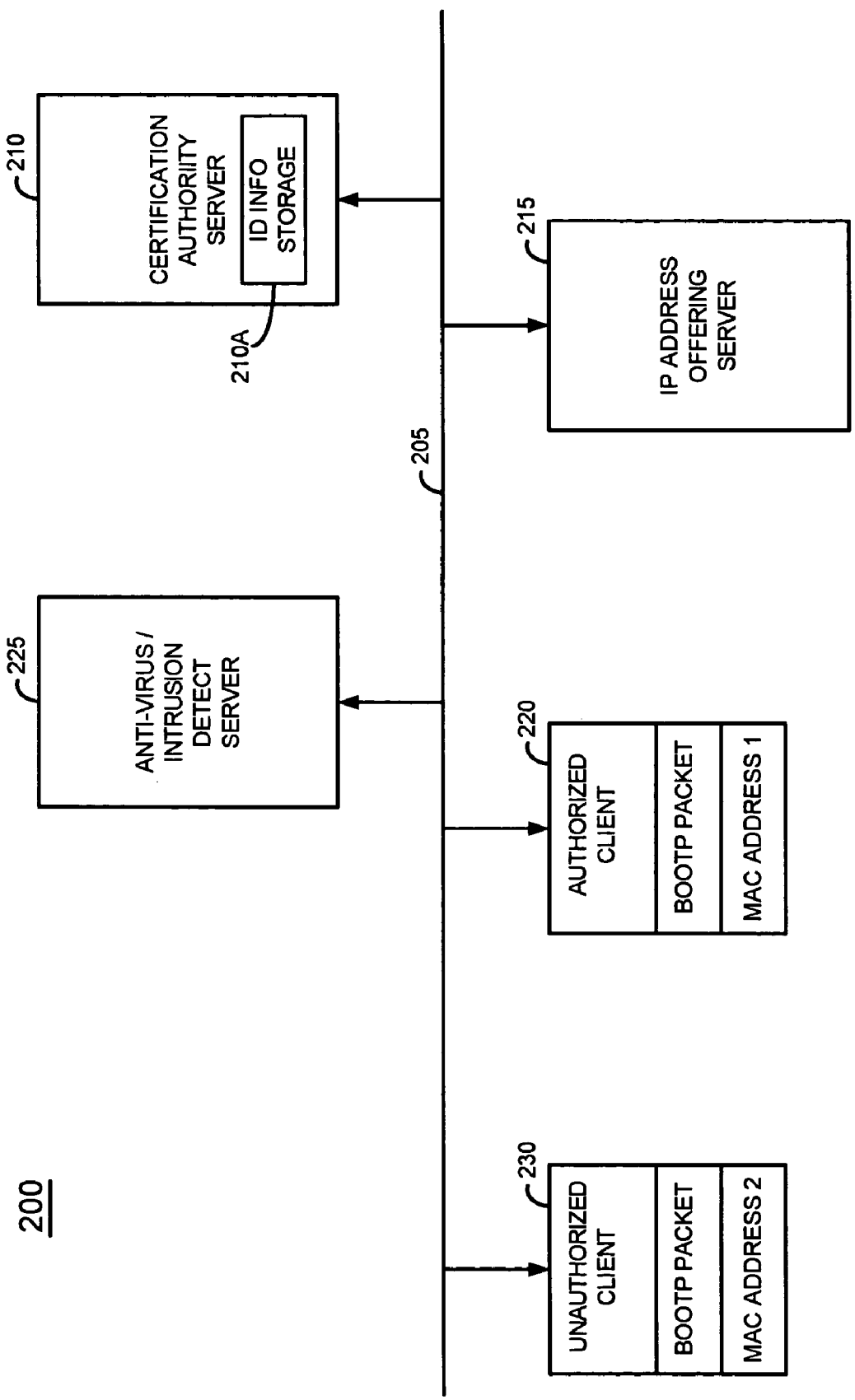
FIG. 2 is a block diagram of the disclosed computer network showing both authorized and unauthorized client systems.

FIG. 2 is a block diagram of the disclosed networked computer system 200 shown in an operational scenario in which both an authorized client and an unauthorized client request assignment of an IP address. System 200 includes a network backbone 205 which is either a wired or wireless connection. A certification authority server 210 is coupled to network backbone 205 as shown. Certification authority server 210 includes a list or database of authorized client systems, namely client ID codes or other client identification information corresponding to those clients that are authorized to operate on network backbone 205 and to connect to IP address offering server 215 for the purpose of obtaining a dynamically assigned IP address from server 215. In more detail, ID information storage 210A of certification authority server 210 permanently stores a list of unique ID codes which includes the media access control (MAC) addresses of those clients, such as client 220, that are authorized to operate on the network and to access server 215. A MAC address is a unique identifier which is bound to the hardware of the network interface in client systems. Thus, the MAC address does not change over time. The list of client ID codes or client ID information in ID information storage 210A is created and maintained by a network administrator. In one embodiment of networked computer system 200, certification authority server 210 also stores the address of the particular IP address server to which a particular authorized client is to be directed to obtain an IP address. It is possible that different authorized clients may be sent to different IP address offering servers in some systems. An anti-virus/intrusion detect server 225 is coupled to network backbone 205 and will be discussed in more detail later.

The process by which an authorized client such as client 220 obtains access to IP address offering server 215 is now described. When an authorized client 220 connects to network system 200, authorized client 200 performs a BootP (bootstrap protocol) broadcast to transmit its MAC address and a request for assignment of a dynamic IP address over the network. Certification authority server 210 receives this information and acts upon it as now described. Since certification authority server 210 contains the MAC address of authorized client 220 in its list of authorized clients, the MAC address of client 220 is accepted and IP address offering server 215 is instructed to issue an IP address to authorized client 220. IP address offering server 215 sends authorized client 220 an IP address. Authorized client 220 then commences operation on the network by using the IP address it received from IP address offering server 215.

The interaction of an unauthorized client such as client 230 with the network is now described. It is first noted that the MAC address of unauthorized client 230 is not stored in the list of authorized clients contained in storage 210A of certification authority server 210. When unauthorized client 230 attempts to connect to the network it performs a BootP broadcast to transmit its MAC address and a request for assignment of a dynamic IP address over the network. Since the MAC address of unauthorized client 230 is not on the list of authorized clients in certification authority server 210, server 210 does not accept the MAC address of the unauthorized client. In one embodiment, certification authority server 210 informs IP address offering server 215 of the rejection of unauthorized client 230 so that server 215 will not assign an IP address to unauthorized client 220. Unauthorized client 230 is prevented or blocked from any further communication on the network. In another embodiment, the MAC address of client 230 is not accepted and a virus scan of unauthorized client 230 is conducted by anti-virus/intrusion detect server 225. Virus scanning software is installed on anti-virus server 225 to enable this virus scan. In this virus scan scenario, IP address offering server 215 assigns an IP address to unauthorized client 230 so that anti-virus server 225 can access unauthorized client 230 and run a virus scan of unauthorized client 230. The network connection protocol used to communicate among the clients and servers in networked system 200 can be BootP or Dynamic Host Configuration Protocol (DHCP), for example. Other networking protocols can be used as well depending on the particular application.

In actual practice a "waiting list" 305 such as shown in FIG. 3A is stored in ID information storage 210A shown earlier in FIG. 2. When authorized clients 220 and unauthorized clients 230 attempt to connect to the network, they transmit respective BootP packets which include respective MAC addresses for those clients. These MAC addresses are also referred to as source addresses because they indicate the particular client which is the source that transmitted the BootP packet. The BootP packets with their MAC addresses are collected and stored in waiting list 305 in storage 210A in certification authority server 210. More particularly, each source address is stored together with the respective time at which the BootP packet arrived at certification authority server 210 as seen in FIG. 3A. Waiting list 305 is a database that maintains entries from respective clients that may be regarded as requests for access to the network.

A "to do" list 310 as shown in FIG. 3B is also stored in ID information storage 210A. To do list 310 is a database that includes the source address, i.e. the MAC address, of clients requesting to connect to the network. Source addresses which have already been authorized by the system administrator are marked with a "permit" designation or action to indicate that they are authorized. Source addresses which were not previously authorized are marked with a "wanted" designation or action to indicate that they are not yet authorized.

Figure 4A:
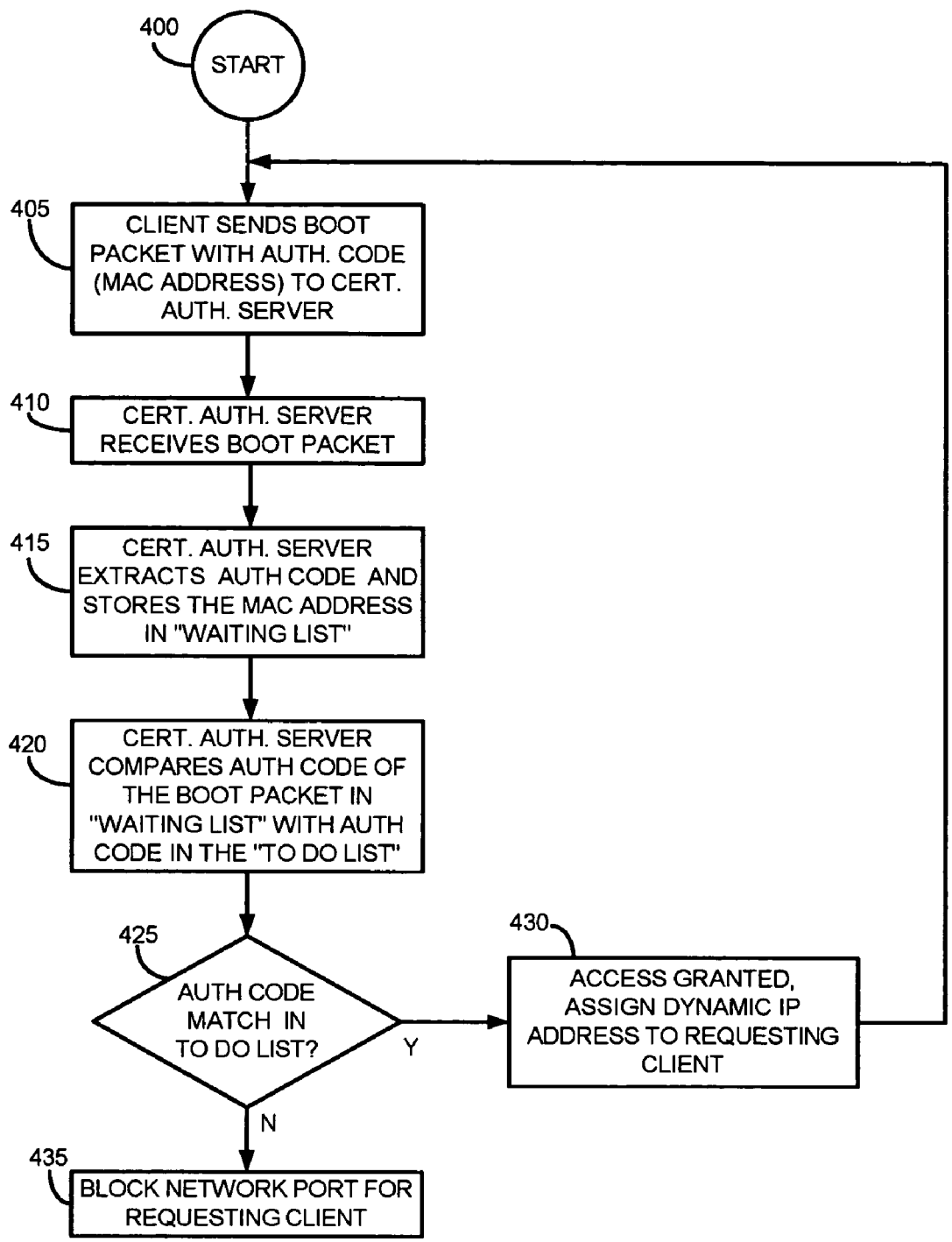
FIG. 4A is a flowchart depicting operation of one embodiment of the disclosed computer network.

FIG. 4A is a flowchart depicting the operation of networked system 200 in one embodiment of the invention. Process flow commences at start block 400 at which a client attempts to connect to the network. As part of the attempt to connect, the client sends a boot packet including an authorization code to the certification authority server 210 as per block 405. In this particular embodiment, the MAC address of the client is used as the authorization code although other codes unique to the particular client can be used as well. As per block 410, certification authority server 210 receives the boot packet from the requesting client that is the source of the connect request. Certification authority server 210 then extracts the authentication code, here the MAC address, from the received packet and stores the authentication code in waiting list 305 as per block 415. Certification authority server 210 then compares the authentication code from the received boot packet in waiting list 305 with the authentication codes in "to do" list 310 as per block 420. If an authentication code match is found in test 425, then the requesting client is granted access to the network and is assigned a dynamic IP address as per block 430. Process flow then continues back to block 405 at which the system continues to process requests for access by client systems. Returning now to testing block 425, if a authentication code match is not found, then the network port of the requesting client is blocked as per block 435. The requesting client is thus denied access to the network.

Figure 4B:
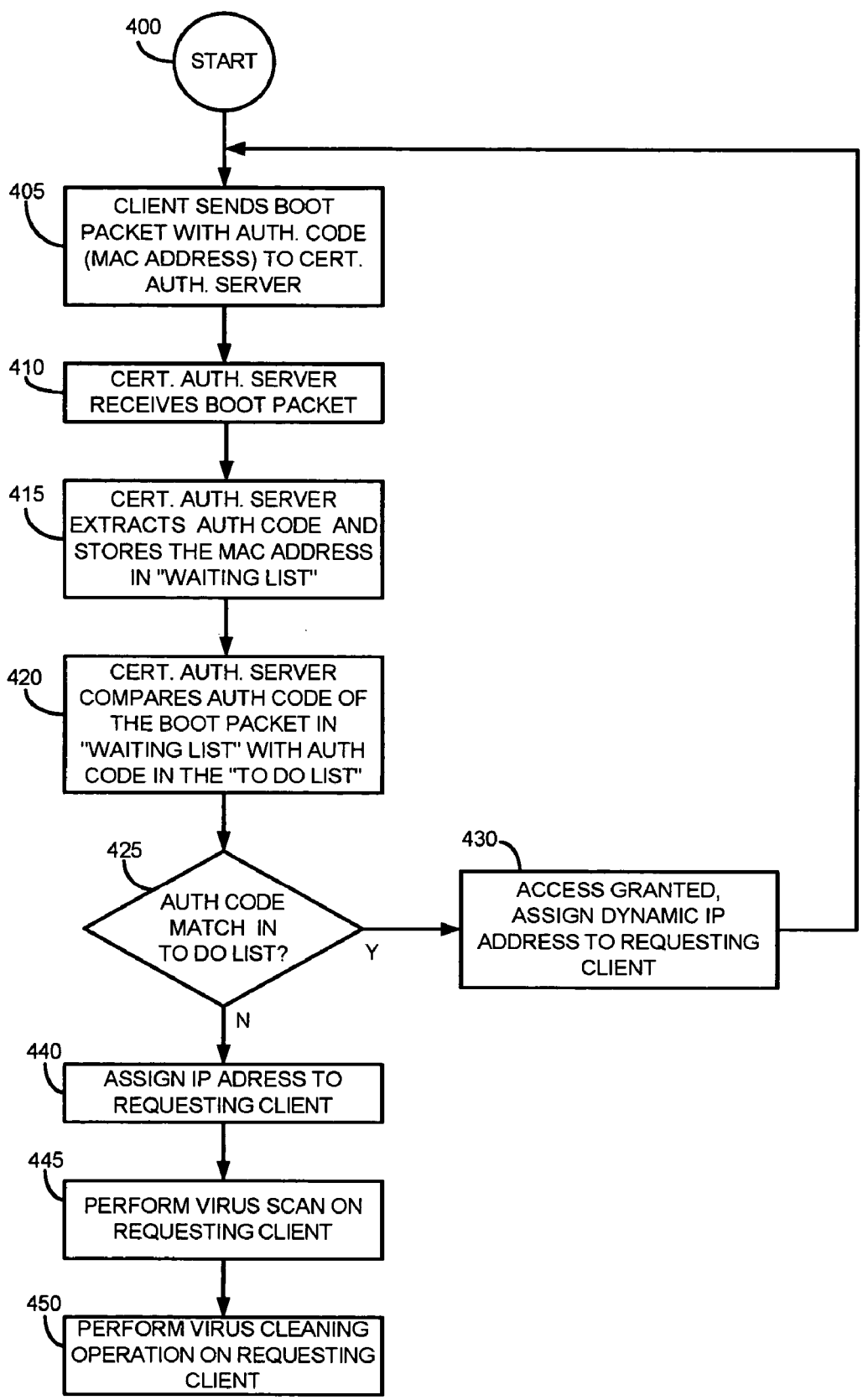
FIG. 4B is a flowchart depicting operation of another embodiment of the disclosed computer network.

FIG. 4B is a flowchart depicting operation of another embodiment of networked system 200. In the flowchart of FIG. 4B, blocks 400-430 are the same as in FIG. 4A. However, block 435 of FIG. 4A is replaced with a different block 440 in FIG. 4B. Instead of blocking network access to the requesting unauthorized client, in this embodiment the unauthorized client is assigned an IP address as per block 440 and is then scanned for virus contamination by anti-virus server 225 as per block 445. As per block 450, a virus cleaning operation is then performed on the client system if a virus was found thereon Testing may also be conducted on the requesting unauthorized client to determine if the client is an intruder. In one embodiment, such intrusion detection is performed by using a simple network monitoring protocol (SNMP) trap.

The present disclosure has been described relative to a preferred embodiment. Improvements or modifications that become apparent to persons of ordinary skill in the art only after reading this disclosure are deemed within the spirit and scope of the application. It is understood that several modifications, changes and substitutions are intended in the foregoing disclosure and in some instances some features of the disclosure will be employed without a corresponding use of other features. Accordingly, it is appropriate that the appended claims be construed broadly and in a manner consistent with the scope of the disclosure.

What is claimed is:

1. A method for controlling access by a client system of a network of computer systems including a certification authority server, the method comprising:

storing, by the certification authority server, respective authorization codes for each client system authorized to access the network of computer systems;

connecting a prospective client system to the network of computer systems;

sending to the certification authority server, by the prospective client system, an authorization code unique to the prospective client system;

allowing access by the prospective client system to the network of computer systems if the authorization code of the prospective client system matches an authorization code stored in the certification authority server; and performing, by an anti-virus server, a virus scan of the prospective client system if the authorization code of the prospective client system does not match an authorization code stored in the certification authority server.

2. The method of claim 1 including blocking access by the prospective client system to the network of computer systems if the authorization code of the prospective client system does not match an authorization code stored in the certification authority server.

3. The method of claim 1 wherein the certification authority server includes a database for storing the authentication codes of authorized client systems and the address of a dedicated IP assignment server.

4. The method of claim 1 wherein the authorization code is a MAC address.

5. The method of claim 1 wherein the network includes an IP address offering server.

6. The method of claim 5 wherein the network includes an anti-virus server.

7. The method of claim 5 wherein the IP address server assigns an IP address to the prospective client system.

8. The method of claim 1 including cleaning a virus from the prospective client system if a virus is found therein by the anti-virus server.

9. The method of claim 1 wherein the network employs a DHCP network connection protocol.

10. The method of claim 1 wherein the networked computer system employs a BootP network connection protocol.

11. A network of computer systems comprising:
a network backbone for coupling the computer systems together;
a certification authority server, coupled to the network backbone, for storing respective authorization codes for each client system authorized to access the network of computer systems;
a prospective client system, coupled to the network backbone, seeking access to other computer systems in the network;
a network address offering server, coupled to the network backbone, for providing the prospective client system with a network address if the authorization code of the prospective client system matches an authorization code stored in the certification authority server; and
an anti-virus server, coupled to the network backbone, for scanning the prospective client system for viruses if the authorization code of the prospective client system does not match an authorization code stored in the certification authority server.

12. The network of claim 11 wherein the network address is an IP address.

13. The network of claim 11 wherein the certification authority server includes a database for storing the authentication codes of authorized client systems and the address of the dedicated network address assignment server.

14. The network of claim 11 wherein the network employs a DHCP network connection protocol.

15. The network of claim 11 wherein the network employs a BootP network connection protocol.

* * * * *